United States Patent Office 3,180,876
Patented Apr. 27, 1965

3,180,876
METHOD OF SEPARATING COMPLEX
ACID MIXTURES
Louis A. Joo, Crystal Lake, Ill., assignor to The Pure Oil
Company, Chicago, Ill., a corporation of Ohio
No Drawing. Filed July 13, 1962, Ser. No. 209,780
3 Claims. (Cl. 260—327)

This invention relates to a method of fractionating complex acid mixtures and to the products so obtained. More particularly, this invention relates to a method of treating complex, high-molecular-weight carboxylic acids, such as those derived from sulfur-containing complex polynuclear compounds of petroleum origin, i.e., solvent extracts obtained in the solvent extraction of mineral lubricating oil fractions hydrogenated and refined solvent extracts and FCC recycle stock. The complex acids may be from other sources, hereinafter defined, but the invention has particular application to complex acid mixtures prepared from sulfur-containing complex polynuclear compounds of petroleum origin,, i.e., solvent extracts by metalation, carbonation and acidification, as described in copending applications Ser. No. 819,932, filed June 12, 1959, by T. W. Martinek, and now abandoned, and Ser. No. 79,661, filed December 30, 1960, by W. E. Kramer, L. A. Joo and R. M. Haines. In addition, the invention is applicable to the separation of the acid mixtures formed by the nitrogen dioxide oxidation of solvent extracts described in copending applications Ser. No. 114,637, filed June 5, 1961; Ser. No. 114,677, now U.S. Patent No. 3,135,767, filed June 5, 1961, and Ser. No. 24,883, filed April 27, 1960, and now abandoned, and the halogenated aromatic acids described in copending applications Ser. No. 50,334, filed August 18, 1960, by Joo et al., now U.S. Patent 3,056,773, and Ser. No. 155,835, filed November 29, 1961.

It is known in the art, e.g., Schmidl, U.S. 2,523,154, that petroleum phenols and sulfur compounds, released by the neutralization of solutions obtained when hydrocarbon oils are treated with aqueous alkali, can be freed of undesirable sulfur compounds (mercaptans) by the use of weak acid solutions in the oils in a first step, followed by bringing the pH to about 9 to separate an aqueous phase and an oil phase. Bosing, in U.S. Patent 2,154,372, shows the fractionation of mineral oils by treatment with pyridine and an aqueous alkali solution, simultaneously, to separate three phases: an extract, a reffinate, and an aqueous alkali phase, and further contacting the raffinate with additional solvent and alkali solution. The successive treatment of various acidic mixtures with carbon dioxide at different pressures is taught as a means of separating acids by Pilst in U.S. 2,188,013. The art does not disclose a method of fractionating complex acid mixtures into a series of fractions of differing molecular weights and differing acid numbers, particularly as applied to the complex acids derived from solvent extracts as defined herein. The materials separated may be present as free acids in the oil solution after carbonation and acidification, or they may be present as salts after carbonation in which case, they are converted to free acids by acidification prior to treatment in accordance with this invention.

The process of this invention consists essentially of (1) dissolving a given amount of the complex mixture of acids to be fractionated in a critical amount of a first aromatic solvent other than benzene in which the free acids are fairly soluble; (2) adding an additional amount of a second or same aromatic solvent which causes the precipitation of high-acid-number polybasic acid as the first portion of the desired acids; (3) separating the precipitated acids from the resulting mixture; (4) adding another additional amount of the second or first aromatic solvent to the remaining solution; (5) again separating the acids thus liberated or precipitated; and (6) continuing this cyclic addition of incremental amounts of said second or first solvent and subsequent separation until no more precipitate is obtained.

The essence of the discovery is based on the finding that by dissolving a limited amount of the complex acid mixture, in the order of 10 to 40% by wt. in an aromatic solvent, other than benzene, the subsequent sequential additions of more of the same or different solvent (excluding benzene) causes quite unexpectedly the precipitation of the complex acids in reverse order of acidity, that is, the more acidic and high-molecular-weight acids, containing the higher number of carboxyl groups per molecule, precipitate first, and gradually portions of lower and lower molecular weight, containing fewer and fewer carboxyl groups per molecule, are separated as more of the same or different aromatic solvent is added sequentially and in increments.

The method of this invention utilizes fractional precipitation to separate complex acid mixtures where less complex system or methods, such as distillation, crystallization, extraction, etc., are ineffective.

Accordingly, it becomes a primary object of this invention to provide a process for separating complex acid mixtures into fractions of varying molecular weight and varying acid number.

Another object of this invention is to provide fractions of complex acids of different molecular weights and different acid numbers.

An object of this invention is to provide a process of separating complex, high-molecular-weight, carboxylic acids by stepwise precipitation using particular solvents.

An object of this invention is to provide a process of separating mixtures of complex, high-molecular-weight, polycarboxylic acids by stepwise precipitation and separation of solid phases until the original mixture is substantially free of the desired acids.

The method of this invention constitutes an improvement over the method described in copending application Ser. No. 161,355, filed December 22, 1961, and the method of copending application Serial No. 209,741, filed July 13, 1962. The method of this invention distinguishes thereover in that it applies a different technique and results in the formation of acid fractions which are predominantly dibasic and have relatively high molecular weights followed by acid fractions which are still predominantly dibasic but which have somewhat lower molecular weights.

This invention shows that complex mixtures of organic acids containing mono-, di-, tri- and higher polybasic acids, can be divided into fractions of sharply reduced complexity by a novel process of fractional precipitation, involving the use of an aromatic solvent.

In one aspect of the process of my invention, the following stepwise procedure is followed:

(1) The complex mixture of acids is dissolved in a critical amount of an aromatic solvent other than benzene.

(2) An additional amount of the aromatic solvent or of another selected aromatic solvent, other than benzene, is added causing precipitation of high-acid-number acids.

(3) The resulting precipitate is filtered, washed, and dried.

(4) Another additional amount of the selected aromatic solvent is added.

(5) The resulting second precipitate is filtered, washed, and dried.

(6) The cyclic precipitation and filtration is repeated until no more precipitate forms upon the addition of solvent, and the solute contains primarily monobasic acids.

This process is particularly useful in dividing extract polybasic acids into fractions concentrated in (1) monobasic acids, and (2) di-, tri-, and higher polybasic acids. This process is most effective when there is a high acid number, i.e., there is a relatively high concentration of di-, tri-, and higher polybasic acids. The solvent used is preferably toluene or xylene, but it appears that any pure or predominantly aromatic solvent other than benzene may be used. The relative proportion of solvent aromatic to solute acids is critical; it appears that the starting concentration of acids must be in the range of about 10–40% wt. The critical concentration will vary somewhat within these ranges with the nature of the acids and the aromatic solvents employed.

In order to demonstrate the invention, the following examples are given:

EXAMPLE I

A 10.8-g. portion of extract polybasic acid, having an acid number of 218 and a molecular weight of 410, was dissolved in 22 ml. of toluene. The solution was cloudy until more than 4 g. of acid was dissolved. The final solution was clear. Then a 250-ml. portion of toluene was added to the solution, resulting in the development of cloudiness within 5 minutes and a coagulated precipitate within one-half hour. The precipitate was separated by filtration washed with pentane, and dried, and the dried precipitate was designated Fraction 1.

A 350-ml. portion of toluene was added to the filtrate, resulting in a second precipitate which was separated, washed, dried, and designated as Fraction 2.

A 500-ml. portion of toluene was added to the filtrate, resulting in a third precipitate which was separated, washed, dried, and designated as Fraction 3.

Addition of 1000 ml. of toluene to the filtrate resulted in no more precipitation.

The tabulation below provides a summary of characterizations of the fractions produced in this experiment.

| Fraction No. | Amount (g.) | Acid No. | Molecular weight | —COOH/ molecule | Percent unsap. |
|---|---|---|---|---|---|
| (Charge) | 10.8 | 218 | 410 | 1.60 | 5.1 |
| 1 | 0.30 | 307 | 420 | 2.30 | |
| 2 | 0.13 | 295 | 420 | 2.21 | |
| 3 | 0.10 | 288 | 410 | 2.10 | |

The process of this invention is applicable to many different, complex, high-molecular-weight, carboxylic acid mixtures such as those obtained by the oxidation of complex alcohol and aldehyde mixtures using potassium permanganate and sulfuric acid; and those produced by the metalation of solvent extracts followed by carbonation, and conversion of the salts so produced to acids by acidification. The latter have been used to demonstrate this invention because they are particularly difficult to handle and purify due to the complex nature of the source material, that is, the presence of condensed rings and heterocyclic substituents in the molecules, the varied placement of the carboxyl groups thereon, and the presence of side chains.

The complex carboxylic acids to be treated in accordance with this invention are in the form of free acids and are represented by the formula, $$R(COOH)_n$$

where R is a complex, aromatic, alkylaromatic or heterocyclic nucleus, and $n$ has a value of 1 to 7, and preferably 1 to 4.

R in the foregoing formula may be any complex organic ring system or combination of organic ring systems such as furan, thiofuran, benzene, substituted benzene, 1,2-pyran, 1,4-pyran, indene, isoindene, benzofuran, isobenzofuran, benzisoxazole, naphthalene, substituted naphthalene, acenaphthene, fluorene, anthracene, phenanthrene, xanthene, thianthrene, naphthacene, chrysene, pyrene, and triphenylene.

As a preferred embodiment of this invention, and illustrative of acids containing a complex R group in the foregoing formula, are acids derived from solvent extracts or other sources of complex aromatic nuclei by metalation, carbonation, and acidification.

The starting material for the reaction may be any complex, aromatic and/or heterocyclic mixture or compound from synthetic or natural sources. A preferred and unique source of aromatic starting material comprises petroleum fractions rich in complex polynuclear aromatic hydrocarbons, not only because the acid products therefrom are difficult to purify and separate by ordinary means, but also because the techniques outlined herein are particularly adapted to processing these more complex and resistant source materials.

Illustrating the preferred and novel starting materials as a source of the R group in the class of materials known as solvent extracts from the manufacture of mineral lubricating oils. These solvent extracts are rich in complex, polynuclear, aryl, alkaryl, condensed-ring and heterocyclic nuclei forming the organic portion of the carboxylic acids to be treated in accordance with this invention. Solvent extracts from the manufacture of bright stock and neutral lubricating oils are particular examples of such fractions rich in complex aromatic compounds, obtained as by-products from the solvent refining of mineral oils.

The extracts, hereinafter referred to as solvent extracts, are obtained as the extract or solvent phase when lubricating oils are refined by treatment with a selective solvent having an affinity for aromatic and sulfur compounds. The complex hydrocarbons removed by this refining treatment contain appreciable amounts of combined sulfur, nitrogen and oxygen as part of the molecules. These complex hydrocarbons contain a predominance of polynuclear rings of aromatic structure, and of condensed configurations having or containing hydrocarbon substituent groups attached thereto as side chains. These starting materials are of a generally viscous nature, have low viscosity indices and low resistance to oxidation, and are considered to be deleterious in lubricating oils. Heretofore, these aromatic extracts have been regarded as waste products, and because they are exceedingly complicated mixtures of complex compounds, including various sulfur-, oxygen-, and nitrogen-containing compounds, they have not been used successfully in preparing petrochemicals or as sources of hydrocarbon reactants or starting materials.

Since the general process of refining mineral lubricating oils in which solvent extracts are obtained is well known, and typical procedures are set forth in said copending applications relating to their utilization, it is only necessary herein to set forth some illustrative and non-limiting examples in the following table:

The complexity of the types of compounds present which become the R groups of the polybasic acids, as based on

Table I.—Sources and physical characteristics of solvent extracts

| Ext. No. | Crude Source | Solvent | API Grav. | Sp. Gr. @ 10° F. | Vis/100° F. | Vis/130° F. | Vis/210° F. | V.I. | °F. Pour | °F. Flash | °F. Fire | Iodine No. (Wijs) | Percent C.R. | Percent sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.66 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.88 |
| 9 | Santa Fe Springs | do | 10.2 | 0.9934 | | | 371 | | +65 | 520 | 600 | 69.4 | | |
| 10 | Texas | Furfural | 13.0 | 0.9791 | | | 1,500 | | +85 | 470 | 515 | 57.1 | | |
| 11 | Penn | Chlorex | 12.2 | 0.9843 | | | 1,365 | | +85 | 560 | 630 | 71.4 | | |
| 12 | do | Nitrobenzene | 10.0 | 1.000 | | | 1,500 | | +75 | 555 | 640 | 60 | | |
| 13 | Mid-Cont | Propane-cresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 23 | do | do | | | | | | −55 | +70 | | | | 1.1 | 2.75 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 VI neutral, had an average molecular weight of 300, and contained 76.8% aromatics (by the silica gel procedure).

Extract No. 42 was obtained in the production of 150 VI Bright Stock, had an average molecular weight of 590, and contained 86% aromatics, 14% saturates, 86.2% carbon, 11.4% hydrogen, and averaged 3.3 aromatic rings per aromatic molecule.

Extract No. 43 was obtained in the production of 170 VI neutral, had an average molecular weight of 340, contained 87.0% aromatics, 13% saturates, 86.4% carbon, 10.7% hydrogen and averaged 2.7 aromatic rings per aromatic molecule.

Extract No. 44 was obtained in the production of 200 VI neutral, had an average molecular weight of 340, and contained 87% aromatics, and 13% saturates.

Extract No. 45 was obtained in the production of 160 VI Bright Stock, and contained 92% aromatics and 8% saturates.

The solvent extracts from lubricating oils used as starting materials in preparing acid mixtures suitable for fractionation in accordance with this invention have the following general properties and characteristics:

Table II

| Characteristic | Range of value |
|---|---|
| Gravity, °API | 7.3–18.3 |
| Gravity, Sp., 60/60° F | 0.9446–1.0195 |
| Viscosity SUS at 210° F | 40–1,500 |
| Viscosity index | −153–plus 39 |
| Pour point, °F | 20–115 |
| Color, NPA | 2–5D |
| Molecular weight, average (above 300) | 320–750 |
| Sulfur, Percent wt | Above 0.6 |
| Nitrogen, Percent wt | Below 1 |
| Aromatic compounds, Percent (including heterocyclics) | 75–98 |
| Av. No. of rings/mean arom. mol | 1.7–3.5 |

The solvent extracts are characterized by containing aromatic and heterocyclic compounds in the range of 75–98%, the remainder being principally saturates, or material behaving as saturates, together with a minor proportion of up to about 7% of organic acids. The organic acids present are not susceptible to extraction by the use of aqueous strong caustic because of the solubility of the alkali metal salts of the acids in the oil. Little or no asphaltic material is present in solvent extracts and they contain essentially no materials volatile at room temperature.

these analyses, is illustrated by the following table:

Table III.—Estimated chemical composition of solvent extracts Nos. 19, 21, 43 and 44 of Table I

| Type of compound | Approx. percent in the extract |
|---|---|
| Saturated hydrocarbons | 12.5 |
| Mononuclear aromatics: | |
| Substituted benzenes | 25.0 |
| Dinuclear aromatics: | |
| Substituted naphthalenes | 30.0 |
| Trinuclear aromatics: | |
| Substituted phenanthrenes | 10.0 |
| Substituted anthracenes | 5.0 |
| Tetranuclear aromatics: | |
| Substituted chrysenes | 00.5 |
| Substituted benzphenanthrenes | 0.2 |
| Substituted pyrenes | 0.2 |
| Pentanuclear aromatics: Perylene | 0.01 |
| Sulfur compounds,[1] oxygen compounds, etc | 16.5 |

[1] Mainly heterocyclic compounds. The average mol. wt. of Extracts 19 and 21 is 340, and that of Extract 20 is 590.

Without limiting the invention, the characteristics of the acid products or mixtures to be separated as an illustration of this invention are further disclosed as thus far evaluated. The novel carboxylic acids separated in accordance with this invention are mixtures of acids of the dihydronaphthalene, dihydrophenanthrene, and dihydroanthracene types averaging in molecular weight from about 375 to 450, and having several alkyl groups on each aromatic nucleus, wherein the sum of the carbon atoms in the alkyl or cycloalkyl substituents varies between 10 and 22. Despite the size of the acid molecules, the linkages through or between the carboxyl groups are about the same as those of phthalic and terephthalic acids. A portion of the aromatic rings or condensed aromatic rings is probably further condensed with naphthenic rings to form configurations similar to the steroid ring systems. Extract acids from solvent extracts obtained in the production of bright stocks probably contain more highly condensed aromatic structures. Most of the sulfur (1.0 to 4.5% total sulfur being present) is in the form of heterocyclic rings with carbon, associated with both the aromatic-type and naphthenic-type structures present. Only a trace amount of the sulfur is present as high-molecular-weight aliphatic sulfides.

The nitrogen content of distilled solvent extracts is 0.91 to 0.04%. Analysis for the types of carbon linkages as percent $C_a$ (carbon atoms in aromatic configuration), percent $C_n$ (carbon atoms in naphthenic configuration), and percent $C_p$ (carbon atoms in paraffinic configuration) gives results ranging from about 30–40% $C_a$, 20–35% $C_n$ and 31–47% $C_p$, using the method of Kurtz, King, Stout, Partikian and Skrabek (Anal. Chem. 28–1928 (1956)). The extract acids have acid numbers (1948 Method) of 150–300, M.P. 80–90° C., Br No. 4–24, sulfur 1.7–2.3%, are deep red in color and transparent in thin sheets, and contain 2–6% unsaponifiables. They are soluble in ethyl-ether, acetone, MEK, tetrahydrofuran, benzene, toluene and xylene. The acids are useful in preparing various resins including alkyd, polyester, polyamide, and epoxy resins, and also have utility as corrosion inhibitors.

Although the invention has been demonstrated by a number of examples, these are not to be construed as limiting. The term "solvent extracts" is used in its recognized meaning in the solvent extraction art. The term "extract acids" or "extract polycarboxylic acids" used herein shall be construed to include acids containing 1 to 7 carboxyl groups per molecule, and principally containing 1 to 4 carboxyl groups per molecule.

The metalation derived acids are more accurately described as dihydrocarboxylic acids, since there is a change in structure with the introduction of the carboxyl groups. A very simplified structure for the dibasic acid fraction, without showing position of the numerous alkyl substituents or the heterocyclic nuclei, and the relative percentage of each structure, may be:

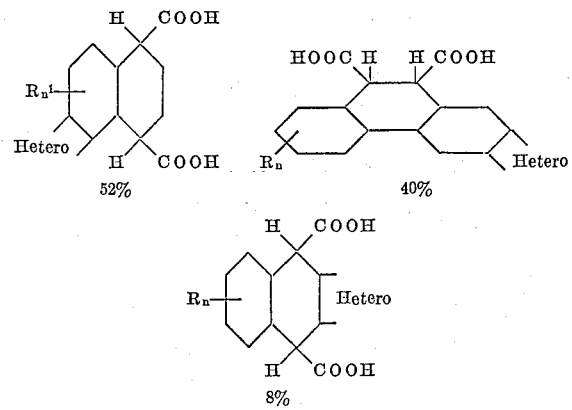

where $R^1$ comprises alkyl and/or cycloalkyl substituents having a sum of about 10 to 22 carbon atoms in each formula, $n$ is the number of such alkyl groups and may be from 3 to 10, and "hetero" represents one or more S-, N-, or O-containing heterocyclic rings in the molecule. The molecular weight of the acids ranges from 300 to 600, and averages 325–450. R can be one or more cycloalkyl radicals, or mixed alkyl and cycloalkyl radicals.

The formulae supra are merely illustrative of the dibasic acid fraction, and the acid fractions produced by the process of this invention can be predominantly monobasic, predominantly dibasic, or predominantly tribasic, etc., with the residual fractions having as many as seven carboxyl groups per molecule. The relative proportions of each type of acid present in the various fractions depends somewhat on the processing conditions applied in the original acid preparation as is taught in the early applications. Since the acids produced by metalation contain one more carbon atom per carboxyl group due to the carbonation reaction, their structures and also the position of the carboxyl group on the molecule will vary from the acids prepared by other methods, and/or from other starting materials. Thus the acids produced by the method of application Serial No. 24,883 will have their carboxyl groups positioned in relation to the alkyl radical oxidized by the nitrogen dioxide. Similarly, the acids separated when using the mixed acids produced by halogenation according to the process of application Serial No. 50,334 will contain halogen substituents in addition to carboxyl groups resulting from metalation, carbonation, and acidification. These distinctions are apparent to one skilled in the art and need no further explanation.

The following Table IV gives the physical properties of typical extract acids:

Table IV.—Physical properties of extract acids

| Property: | Value |
|---|---|
| Acid number | 150–300 |
| Melting points ° C | 80–90 |
| Bromine No. | 4–24 |
| Percent sulfur | 1.0–2.3 |
| Color | Deep red |
| Percent unsaponifiables | 2–6 |

In order to further illustrate the complexity and types of acids that can be treated in accordance with this invention, the following tabulation is given of the physical and chemical properties of acids prepared from solvent extracts from mineral lubricating oils. These acids are essentially mixtures of mono-, di-, and polycarboxylic acids having an R group as heretofore illustrated, some of which are prepared by halogenation of the foregoing acid mixture, and still others prepared by nitrogen-dioxide oxidation.

Table V.—Typical properties of a number of example complex acids

A. Mixed Acids Prepared from Solvent Extracts

| No. | Sap. value | Mol. wt. | Percent S | Br. No. | Percent unsap. | Eq. wt. | Eqs/mol | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 3.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |

B.

| 8a | | 770 | | | | | | 29 |
|---|---|---|---|---|---|---|---|---|
| 8b | | 670 | | | | | 1.9 | 151 |
| 8c | | 670 | | | | | | 150 |
| 8d | | 680 | | | | | | 160 |
| 8e | | | | | | | | 45 |
| 101 | | 405 | | | | 9.0 | | 168 |

The species of acids bearing Sample Numbers 8 to 8e inclusive are described in detail in four related copending applications. Acid Sample No. 8 was prepared by reaction of 63% by wt. of $NO_2$ with solvent extract at 140° C. in accordance with application Ser. No. 24,883. Sample No. 8 contained 2.4% nitrogen as a result of $NO_2$ oxidation. Acid Sample Nos. 8a, 8b, 8c and 8d were prepared in accordance with the $NO_2$ oxidation process of application Ser. No. 114,637. Acid Sample No. 8c was prepared by the method of Example I of application Ser. No. 114,677. Sample No. 1 contains 2–1 carboxyl groups/molecule and No. 3 contains more than 2.0 carboxyl groups/molecule.

The halo-acids prepared in accordance with copending application Ser. No. 155,835, as described in Examples I, II, III, and IV thereof, represent additional species of high-molecular-weight acids, containing 1 to 5 halogen atoms, that may be treated in accordance with this invention. In addition, the polyhalo acids described in copending application Serial No. 50,334, such as those set forth in Examples I, II, III, and IV therein, may be separated by the process of this invention. Also, the acids prepared by the methods of Examples II, III, IV, V, VI and VII of application Serial No. 114,677 may be purified and fractionated in accordance with this invention.

The acid used to liberate the free acid mixture of complex organic carboxylic acids from their salt forms may be a mineral acid such as hydrochloric, hydrobromic, hydroiodic, acetic, chloroacetic, sulfur, or phosphoric acid, that is any strong or relatively strong acid. Strong acids are preferably used in diluted form, e.g., 20% to 50% by volume of acid in aqueous solution.

The solvent used in the original solution and in the cyclic precipitation is preferably a solvent in which the free-acid mixture has limited solubility, e.g., toluene, the xylenes, methylbenzene, propylbenzene, isopropylbenzene, diphenyl, methylnaphthalene, butylbenzene, p-diethylbenzene etc., except benzene itself. The critical concentration of the initial complex acid mixture will vary within the range of 10% to 40% by wt. depending on the nature of the acid mixture to be treated and the aromatic solvent used. Benzene is excluded as a solvent within the meaning of this invention as disclosed and claimed for the simple reason that it does not work, at least under the conditions so far applied. Where the acid mixture to be treated happens to be soluble in the aromatic solvent to an extent greater than 40% by wt., such greater concentrations may be used, but the subsequent additions of incremental amounts of additional aromatic solvent must be controlled, and the separation by any known mechanical means, such as filtration, decantation, centrifuging, etc., must be carefully watched to avoid contamination from undesired fractions of the acids or to avoid the inclusion of acids that have mixed characteristics.

The effect of temperature on the separation can be readily determined by experiment. It is probable that the critical concentraions set forth herein may vary somewhat, within the limits stated, for different temperatures, and for some temperatures may fall outside these limits. Also, improved fractionations may be obtained at particular temperatures other than ambient. The critical concentrations as herein defined apply to temperatures of about 10° C. to 40° C., which, for present purposes, are considered to be substantially ambient temperatures.

The high-molecular-weight, complex organic acids to be treated in accordance with this invention are not soluble in water and have limited solubility in the first solvent. The cheapest and most effective first solvent is toluene. The second solvent used can be the same as the first solvent or it may be a different aromatic solvent which is essentially inert. In carrying out the method of this invention, the incremental portions of second solvent are at least equal to the original volume of the solution of the complex acid mixture and preferably are about 4 to 5 times as great. Thus, if the original volume of solute is 100 ml., the separation can be accomplished by adding several separate 100-ml. batches of solvent, and separating the precipitate after each addition. Also, each subsequent addition or incremental portion of solvent may be gradually increased, i.e., with an original solute of 100 ml., the next portion of solvent to separate the first portion of acids can be 500 to 1000 ml., the next 600 to 1500 ml., the next 700 to 2000 ml., etc.

In a preferred embodiment of the invention, the first increment is used in an amount equal to about 8–12 volumes of initial solution, the second about 12–16 vols./vol., the third about 16–22 vols./vol., and the fourth is about 20–50 vols./vol.

At each cyclic precipitation by addition of solvent to the acid solution, between about 1% to 30% of the acids can be liberated, depending on the degree of separation, or purity, or number of fractions desired. Preferably, each incremental solvent addition precipitates about ⅕ to 1/20 of the acids so that a minimum of about 5 to a maximum of about 20 fractions are obtained. The fractionation can be adjusted so that the acid numbers of contiguous fractions may differ by about 10 to 450 or more. In general, as shown by the results obtained herein, the separation is in accordance with the number of carboxyl groups per mole, this value ranging from less than 1.0 to as high as 7, and principally ranging from about 1 to 4, but the separation may also be followed and controlled in accordance with the acid number.

The complex acid mixtures to be separated or fractionated in accordance with this invention may originate from the application of several known methods of acid manufacture, using starting materials other than solvent extracts, as described herein by way of illustration. However, the application of the instant method to the complex acids prepared from solvent extracts represent a feature of this invention because these starting materials and the acid products therefrom not only represent a unique source of complex nuclei but are utilizable in the preparation of resins, polyesters, polyamides, cross-linked polymers, and monomeric derivatives having many desirable and new properties. The source of complex nuclei may also be the FCC cycle stock or reformer bottoms described, which materials contain related complex aromatic and condensed ring compounds amenable to the carboxylation reaction. Thus, the acids may be prepared by:

(1) Transformation of a side chain to a carboxyl group by oxidation.

(2) Replacement of a halogen group by a cyano group followed by acid hydrolysis.

(3) Replacement of an amino group by a cyano group, i.e., diazotization of a primary amine, followed by the Sandmeyer reaction, followed by acid hydrolysis.

Such processes are applied in the preparation of many different aromatic acids to include phthalic acid, isophthalic acid, terephthalic acid, hemimellitic acid, trimellitic acid, trimesic acid, prehnitic acid, mellophanic acid, pyromellitic acid, mellitic acid and diphenic acid, and aryl-substituted paraffinic acids (acids having a phenyl group or other aromatic group at the terminal position of an aliphatic chain) such as phenylacetic acid, hydrocinnamic acid, γ-phenylbutyric acid, δ-phenyl-n-valeric acid, ε-phenyl-n-caproic acid, cinnamic acid, phenylpropiolic acid, homophthalic acid, o-phenylenediacetic acid, n-phenylene-diacetic acid, o-phenyleneacetic-β-propionic acid, and the like. It is to be understood that the acid mixtures to be treated in accordance with this invention may contain mixtures of two or more of the foregoing acids, or homologs thereof, prepared from any charge wherein the aromatic portion thereof is simple and/or complex. The invention has particular application where the acids are complex in nature and cannot be fractionated by distillation and related methods. The method is also applicable to halo-, hydroxy-, and nitro- derivatives of complex aromatic acids.

Accordingly, the method of this invention encompasses the separation of mixtures of carboxylic acids of aromatic character by dissolving the acids in an aromatic solvent, other than benzene, having a low solubility for the free acids, sequentially precipitating limited but significant portions of said free acids by the incremental addition of more solvent, and separating each of said liberated portions from the mixture.

A feature of this invention is the application of this method to the mixture of acids derived from solvent extracts obtained in the solvent refining of mineral lubricating oils by treatment with a solvent selective for aromatic compounds, and metalation, carbonation, and acidification of the solvent extracts. The acids from this source are characterized by their complexity, mol. wt., polynuclear alkaryl and heterocyclic configurations, and the number of rings per mean aromatic molecule.

The invention can be applied to the separation of mixtures of acids having different acidities or acid numbers. The first fractions separated are generally the acids of high acid number, containing the greatest number of carboxyl groups per molecule, the intermediate fractions recovered are of intermediate acid number and contain an intermediate number of carboxyl groups per molecule, and the last fractions separated are of the lowest acid number and contain the least number of carboxyl groups. The various fractions of acids separated may be used as is, further purified, or combined with other fractions and used in resin preparations wherever acids having particular activities, molecular weights, and/or number of carboxyl groups are required. The copending applications incorporated by reference herein disclose other utilities for the products of this invention.

The invention is also directed to the fractionation of complex carboxylic acids prepared from FCC recycle stock boiling in the range of about 589° F. to 745° F., and from hydrogenated, dewaxed and clay-contacted solvent extract, by metalation, carbonation and acidification as described in said application Serial No. 79,661, as related species of sulfur-containing aromatic compounds of petroleum origin along with untreated solvent extracts as the starting material.

As specific examples of refined starting materials containing the complex polynuclear heterocyclic and alkyl-substituted compounds may be cited solvent extracts which have been vacuum-distilled, dewaxed and/or clay-contacted and/or hydrogenated prior to subjection to the metalation, carbonation and acidification reactions. Dewaxing can be accomplished by known methods, e.g., treatment with 45% MEK and 55% toluene as the dewaxing solvent, using temperatures in the order of $-10°$ F., and solvent/solvent extract ratios of about 8/1. This treatment results in a dewaxed extract which has a pour point of $+5°$ F. and results in the removal of about 2% wax having a melting point of about 130° F. Clay-contacting can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100–500 p.s.i.g., using temperatures of 530–600° F., in the presence of a molybdena-silica-alumina catalyst. This same method can be applied to the solvent extracts per se, that is, after the separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are ° API, 9.5; color, NPA, 7; flash (COC), 420° F.; fire (COC), 465° F.; pour point, $-5°$ F.; vis. @ 100° F., 1075 SUS; vis. @ 210° F., 58.5 SUS; V.I., $-96$; Neut. No. (1948), 0.05; sulfur, 2.60 wt. percent and C.R. percent, 0.01.

The hydrogenation of other samples of solvent extract using a Filtrol catalyst, hydrogen to hydrocarbon ratio of about 2 to 2½, LVHSV of about 1.95 to 2.15 at a temperature of about 650 to 700° F. and pressures in the order of 300–500 p.s.i.g. produces hydrogenated extracts having neutralization numbers of about 0.13 to 0.96, containing from about 2.4 to 3.19 wt. percent of sulfur, API gravities of from 8.5 to 12.8 and viscosities at 100° F. from 663.7 to 1457 SUS with viscosity indices ranging from $-33$ to $-115$.

The FCC recycle stock is illustrated by the 19% extract (phenol solvent) of FCC recycle stock, which extract had the following properties: ° API, 1.8; sulfur, 1.9 wt. percent; Br No., 17; RI (20° C.) 1.6372 and Engler distillation, IBP=589° F.; 90%—745° F.

Accordingly, this invention is directed to the method of separating mixtures of carboxylic acids of aromatic character by dissolving the acids in a limited amount of an aromatic solvent having limited solubility for the free acids, precipitating a portion of said free acids by adding an incremental amount of an aromatic solvent, whether the same as or different from the first solvent, having limited solubility for the free acids, and separating the precipitated portion from the mixture. A preferred group of acids or acid mixtures are those produced by the oxidation of aromatic hydrocarbons, acids produced by the transformation of side chains of aromatic hydrocarbons to carboxyl groups, acids produced by the acid hydrolysis of cyano groups on aromatic hydrocarbons, acids produced by the metalation, carbonation and acidification of (a) Aromatic hydrocarbons generally,
(b) Complex heterocyclic aromatic hydrocarbons,
(c) Complex polynuclear side-chain substituted aromatic heterocyclic compounds of petroleum origin as exemplified by solvent extracts, hydrogenated and refined solvent extracts and FCC recycle stock, and
(d) Halo-derivatives of acids of (c).

The invention also relates to the acid fractions so produced.

The embodiments of the invention in which an exclusive property or privilege is claimed are defined as follows.

I claim:

1. The method of separating mixtures of carboxylic acids produced by the metalation, carbonation and acidification of solvent extracts obtained in the solvent extraction of mineral lubrication oils which consists in dissolving said acid mixture in a sufficient amount of toluene to form an acid concentration of about 10 to 40% by weight, adding additional portions of toluene to said solution to precipitate a first fraction of acids, separating said first fraction of precipitated acids from the filtrate and adding additional portions of toluene to said filtrate to form and separate subsequent acid fractions, each of said additional portions of toluene having a volume at least equal to the volume of said acid solution to a volume five times as great as the volume of said acid solution, said acid fractions being characterized by greater acidity, higher molecular weight and containing a higher number of carboxylic groups per molecule than the average acidity, molecular weight or number of carboxylic groups per molecule of said mixture.

2. The method in accordance with claim 1 in which said acid mixture is characterized by having an acid number of about 150–300, a melting point of about 80–90° C. and containing about 1–2.3 wt. percent of combined sulfur.

3. The method of separating mixtures of carboxylic acids having an acid number of about 218 and average molecular weight of about 410 and containing about 1.60 carboxylic groups per molecule produced by the metalation, carbonation and acidification of solvent extracts obtained in the solvent extraction of mineral lubricating oils which consists in dissolving about 36% by weight of said acid mixture in toluene, adding an additional portion of toluene to precipitate a first fraction of acids having an acid number of about 307, a molecular weight of about 420 and containing about 2.30 carboxylic groups per molecule, separating said first fraction of precipitated acids from the filtrate, adding an additional portion of toluene to said filtrate to precipitate a second fraction of acids having an acid number of about 425, a molecular weight of about 420 and containing about 4.21 carboxylic groups per molecule, separating said second fraction of precipitated acids from the filtrate, adding an additional portion of toluene to said filtrate to precipitate a third fraction of acids having an acid number of about 288, a molecular weight of about 410 and about 2.10 carboxylic groups per molecule and separating said third fraction of precipitated acids from said filtrate.

References Cited by the Examiner
UNITED STATES PATENTS 2,840,604   6/58   Feighner et al. _____ 260—525

IRVING MARCUS, *Primary Examiner.*

NICHOLAS S. RIZZO, WALTER A. MODANCE,
*Examiners.*

UNITED STATES PATENT OFFICE
CERTIFICATE OF CORRECTION

Patent No. 3,180,876

April 27, 1965

Louis A. Joo

It is hereby certified that error appears in the above numbered patent requiring correction and that the said Letters Patent should read as corrected below.

Column 2, line 46, for "precipiation" read -- precipitation --; column 8, Table V, under the column heading "Eqs/mol", line 4 thereof, for "3.6" read -- 4.6 --.

Signed and sealed this 26th day of October 1965.

(SEAL)
Attest:

ERNEST W. SWIDER
Attesting Officer

EDWARD J. BRENNER
Commissioner of Patents